(12) United States Patent
Schmelz et al.

(10) Patent No.: US 12,415,702 B2
(45) Date of Patent: Sep. 16, 2025

(54) WRAPPING DEVICE FOR WRAPPING ELONGATED BUNDLED GOODS, AND METHOD FOR WRAPPING BUNDLED GOODS WITH AN ADHESIVE STRIP

(71) Applicant: Komax Taping GmbH & Co. KG, Burghaun (DE)

(72) Inventors: Steffen Schmelz, Geisa (DE); Hans Peter Fladung, Rasdorf (DE); Joerg Sodies, Burghaun (DE); Markus Reisinger, Eiterfeld (DE)

(73) Assignee: Komax Taping GmbH & Co. KG, Burghaun (DE)

( * ) Notice: Subject to any disclaimer, the term of this patent is extended or adjusted under 35 U.S.C. 154(b) by 291 days.

(21) Appl. No.: 18/025,667

(22) PCT Filed: Sep. 10, 2021

(86) PCT No.: PCT/DE2021/100753
§ 371 (c)(1),
(2) Date: Mar. 10, 2023

(87) PCT Pub. No.: WO2022/053112
PCT Pub. Date: Mar. 17, 2022

(65) Prior Publication Data
US 2023/0339715 A1 Oct. 26, 2023

(30) Foreign Application Priority Data
Sep. 11, 2020 (DE) ..................... 10 2020 123 771.5

(51) Int. Cl.
*B65H 35/06* (2006.01)
*B65B 27/10* (2006.01)
(Continued)

(52) U.S. Cl.
CPC ......... *B65H 35/006* (2013.01); *B65B 27/105* (2013.01); *B65B 61/06* (2013.01); *H01B 13/01281* (2013.01); *B65H 2801/81* (2013.01)

(58) Field of Classification Search
CPC .. B65H 35/006; B65H 2801/81; B65B 61/06; B65B 27/105; B25J 11/00
See application file for complete search history.

(56) References Cited

U.S. PATENT DOCUMENTS

| 7,516,916 | B2 * | 4/2009 | Titz ...................... B65H 19/102 242/555.6 |
| 8,002,924 | B2 * | 8/2011 | Machamer ......... B65H 19/1836 156/159 |

(Continued)

FOREIGN PATENT DOCUMENTS

| DE | 196 14 622 A1 | 10/1997 |
| DE | 20 2015 001 990 U1 | 4/2015 |
| DE | 10 2017 109 819 A1 | 11/2018 |

OTHER PUBLICATIONS

International Search Report in PCT/DE2021/100753, mailed Feb. 23, 2022.

*Primary Examiner* — Sang K Kim
(74) *Attorney, Agent, or Firm* — Collard & Roe, P.C.

(57) ABSTRACT

In a winding device for wrapping an elongated bundled item and method for wrapping a bundled item with an adhesive tape in a winding device for wrapping an elongated bundled item with an adhesive tape, a roll for a predetermined length of adhesive tape is held in the winding head. The predetermined length is dimensioned for one portion of the item to be wrapped. A cutting of the adhesive tape on the bundled item can be avoided hereby.

8 Claims, 3 Drawing Sheets

Figure 1:
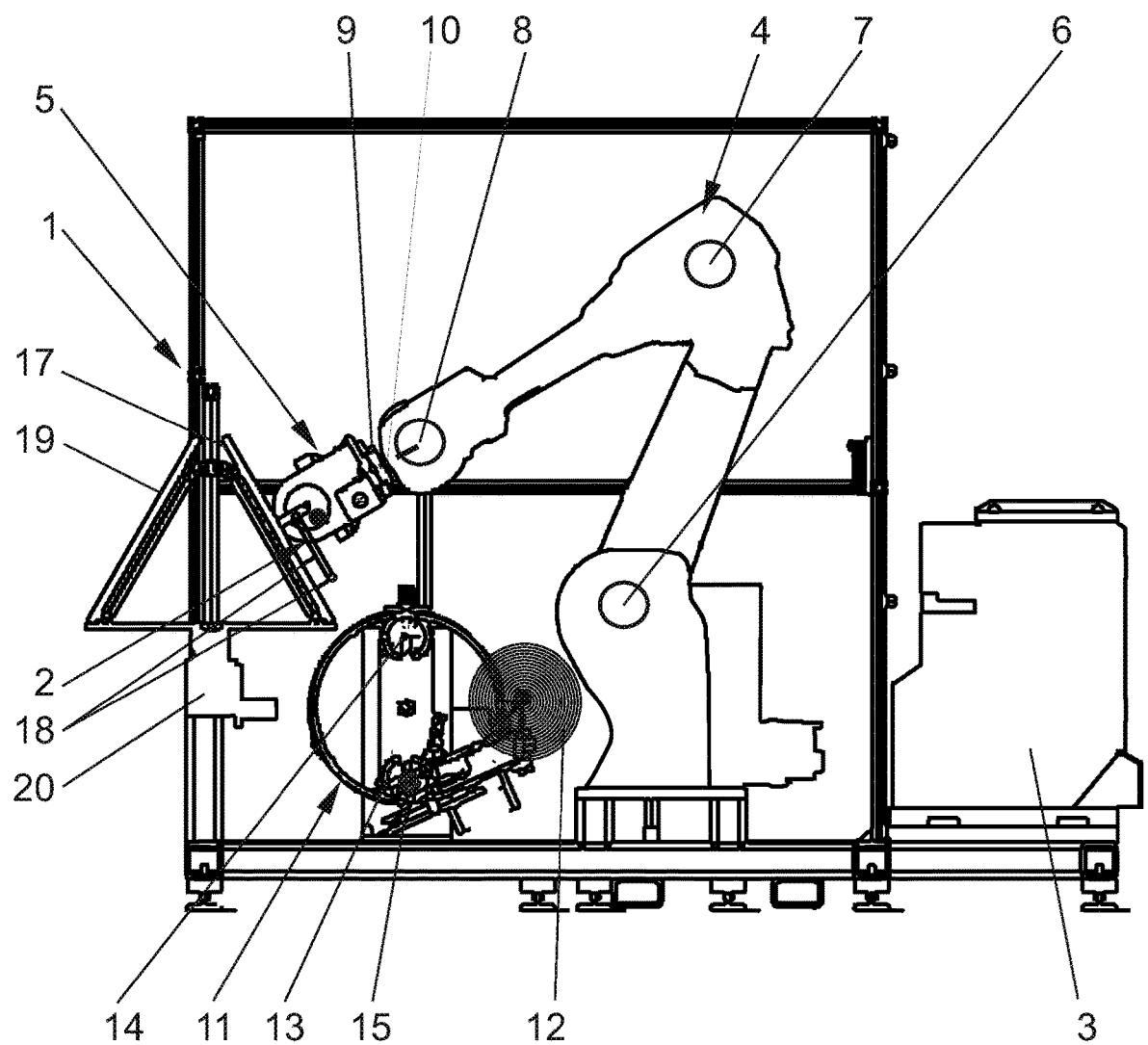

(51) Int. Cl.
*B65B 61/06* (2006.01)
*B65H 35/00* (2006.01)
*H01B 13/012* (2006.01)

(56) References Cited

U.S. PATENT DOCUMENTS

| | | | |
|---|---|---|---|
| 9,711,820 B2* | 7/2017 | Nakakuki | H01M 10/0463 |
| 2019/0071590 A1* | 3/2019 | Hamazaki | C09J 7/40 |

* cited by examiner

WRAPPING DEVICE FOR WRAPPING ELONGATED BUNDLED GOODS, AND METHOD FOR WRAPPING BUNDLED GOODS WITH AN ADHESIVE STRIP

CROSS REFERENCE TO RELATED APPLICATIONS

This application is the National Stage of PCT/DE2021/100753 filed on Sep. 10, 2021, which claims priority under 35 U.S.C. § 119 of German Application No. 10 2020 123 771.5 filed on Sep. 11, 2020, the disclosure of which is incorporated by reference. The international application under PCT article 21(2) was not published in English.

The invention relates to a winding device for wrapping an elongated bundled item with an adhesive tape, having a winding head, having a rotatable body, mounted to rotate, of the winding head, having a roll for the stock of the adhesive tape and having a cutting device for cutting the adhesive tape to a predetermined length. Furthermore, the invention relates to a method for wrapping a bundled item with an adhesive tape using a winding device.

Such a winding device is known, for example, from DE 10 2017 109 819 A1. In that winding device, the roll stocks a large quantity of adhesive tape. However, each portion of the bundled item needs a predetermined length of the adhesive tape, which will be consumed in order to wrap this portion. For this purpose, the winding device has a severing device, with which the adhesive tape is cut off after the wrapping of the corresponding portion. The severing device must therefore cut close to the bundled item which, in the case of bundled items having different thicknesses, may lead to the danger of an incision into the bundled item. Furthermore, the roll containing the stock of adhesive tape and the arrangement of the severing device lead to very large dimensions of the winding head. Hereby the winding head is configured very awkwardly and needs a very large energy consumption for its movement.

From DE 20 2015 001 990 U1, a winding device has become known in which a stock roll for adhesive tape is mounted well-removed from the winding head. In this winding device also, the cutting device is disposed in the vicinity of the bundled item.

The problem underlying the invention is to further develop a winding device of the type mentioned in the introduction to the point that a cutting of the adhesive tape in the vicinity of the bundled item is avoided. Furthermore, a method is to be created that ensures a particularly reliable wrapping of the bundled item.

The first-mentioned problem is solved according to the invention in that the cutting device is disposed outside the winding head and the predetermined length of the adhesive tape is held in the winding head.

By this configuration, the arrangement of the cutting device in the winding head is avoided. Since the winding head carries only the quantity of adhesive tape needed for the portion of the bundled item to be wrapped, a cutting of the adhesive tape after the wrapping of the bundled item is not necessary. Thus a potential damage to the bundled item by the cutting tool is reliably avoided. Due to the omission of the cutting device, the winding head may be made particularly small and compact. After the predetermined length of the adhesive tape has been consumed for wrapping of the predetermined portion of the bundled item, a new adhesive tape can be inserted in the winding head for the next portion. Thus a single bundled item may be wrapped portion-by-portion with different adhesive tapes in simple manner.

It is conducive to further reduction of the dimensions of the winding head when the roll is disposed in the rotatable body and the adhesive tape on the roll is limited to the predetermined length. Hereby the roll does not need any stock of adhesive tape and may therefore be kept particularly small.

According to another advantageous further development of the invention, the preparation of an adequate quantity of adhesive tape is made particularly simple when a stock roll containing a multiple of the predetermined length is disposed outside the winding head.

According to another advantageous further development of the invention, the transfer of the predetermined length of adhesive tape into the winding head is made particularly simple when a rewinding unit is provided with the stock roll containing a multiple of the predetermined length and with at least one roll body for receiving the predetermined length of the adhesive tape, and also has a tape pull-off device for transfer of the adhesive tape from the stock roll to the roll body.

According to another advantageous further development of the invention, the charging of the winding head with the predetermined length of adhesive tape is made particularly simple when the rewinding unit has several receptacles for holding roll bodies. By this configuration, a roll body having the predetermined length of the adhesive tape may be prepared while another already prepared roll body is being offered to the winding head. In this way, the next roll body may be prepared in the rewinding unit containing the predetermined length of adhesive tape for the next portion of the bundled item, while the winding head is wrapping the current portion. Hereby, interruptions during changeover of the roll bodies can be kept particularly short.

According to another advantageous further development of the invention, it is conducive to the further increase of the speed of delivery of the roll when the receptacles can be moved from a winding position, in which the rewinding unit is ready for transfer of the adhesive tape, to a delivery position, in which the receptacle containing the roll is ready for delivery to the winding head.

According to another advantageous further development of the invention, the cutting device is far removed from the bundled item when the cutting device is disposed on the rewinding unit. Due to this configuration, a damage to the bundled item by the cutting device is reliably avoided.

For different portions of the bundled item, different requirements may apply for the adhesive tape to be used. According to another advantageous further development of the invention, different adhesive tapes can be easily used for different portions of the same bundled item when the rewinding unit has several stock rolls containing different adhesive tapes. Hereby, for example in the case of a bundled item formed as a cable harness for a motor vehicle, one portion may be wrapped with a particularly waterproof adhesive tape and another portion with a particularly wear-resistant adhesive tape if the different needs of the portions so require. Likewise, differently colored adhesive tapes may be used in order, for example, to simplify the laying of the cable harness in the motor vehicle.

The second mentioned problem, namely the creation of a particularly reliable method for wrapping the bundled item with an adhesive tape, is solved according to the invention by the following steps:

Cutting the adhesive tape to a length intended for an intended portion of the bundled item Preparation, in a winding head, of the adhesive tape cut to the intended length Wrapping the portion of the bundled item with the adhesive tape cut to the predetermined length By this configuration, the adhesive tape can be cut far away from the bundled item. A damage to the bundled item is avoided thanks to the invention. Furthermore, different adhesive tapes can be simply used portion-by-portion for a bundled item.

According to another advantageous further development of the invention, the preparation of the predetermined length of adhesive tape is made particularly simple when the predetermined length of adhesive tape is pulled off from a stock roll, when the predetermined length is being wound onto a roll body and being cut off from the adhesive tape of the stock roll, and when the roll body containing the predetermined length of adhesive tape is being fed to the winding head.

The invention permits numerous embodiments. For further illustration of its basic principle, one of those is illustrated in the drawing and will be described in the following. This shows in FIG. 1 a winding device containing a bundled item, FIG. 2 an enlarged view of a winding head of the winding device from FIG. 1, FIG. 3 an enlarged view of a rewinding unit of the winding device from FIG. 1, FIG. 4 an overhead view of a simple configuration of the bundled item from FIG. 1.

FIG. 1 shows a winding device 1 for wrapping a bundled item 2, such as, for example, a cable harness, consisting of numerous branched lines, of a motor vehicle. These lines may be electrical lines and/or hose lines. The individual component parts of the winding device 1 are supplied with electrical power and data by a programmable control unit 3.

The winding device 1 has a winding head 5 disposed on a robot arm 4. The robot arm 4 has several schematically illustrated articulated joints 6-9, whereby the winding head 5 can be moved, swiveled and, in addition, turned around its longitudinal axis 10 in all three spatial axes. The articulated joints 6-9 respectively have, not illustrated, drive means activated by the control unit 3.

Furthermore, the winding device 1 has a rewinding unit 11. The rewinding unit 11 carries one or more stock rolls 12 of adhesive tape and has two receptacles 13, 14 for roll bodies 15, onto which a predetermined length of adhesive tape can be unwound. The predetermined length of adhesive tape is dimensioned for one limited portion 16, illustrated in FIG. 4, of the bundled item 2.

The bundled item 2 is clamped by means of holding elements 18 on a mounting board 17. A second mounting board 19 is facing away from the winding head 5 and may be charged with a new bundled item, while the bundled item 2 is being wrapped on the other mounting board 17. The mounting boards 17, 19 can be turned by means of a board drive 20, so that optionally the one mounting board 17 or the other mounting board 19 is facing the winding head 5. Of course, the board drive 20 may also be designed for height adjustment or displacement of the mounting boards 17, 19 perpendicular to the plane of the drawing.

Figure 2:
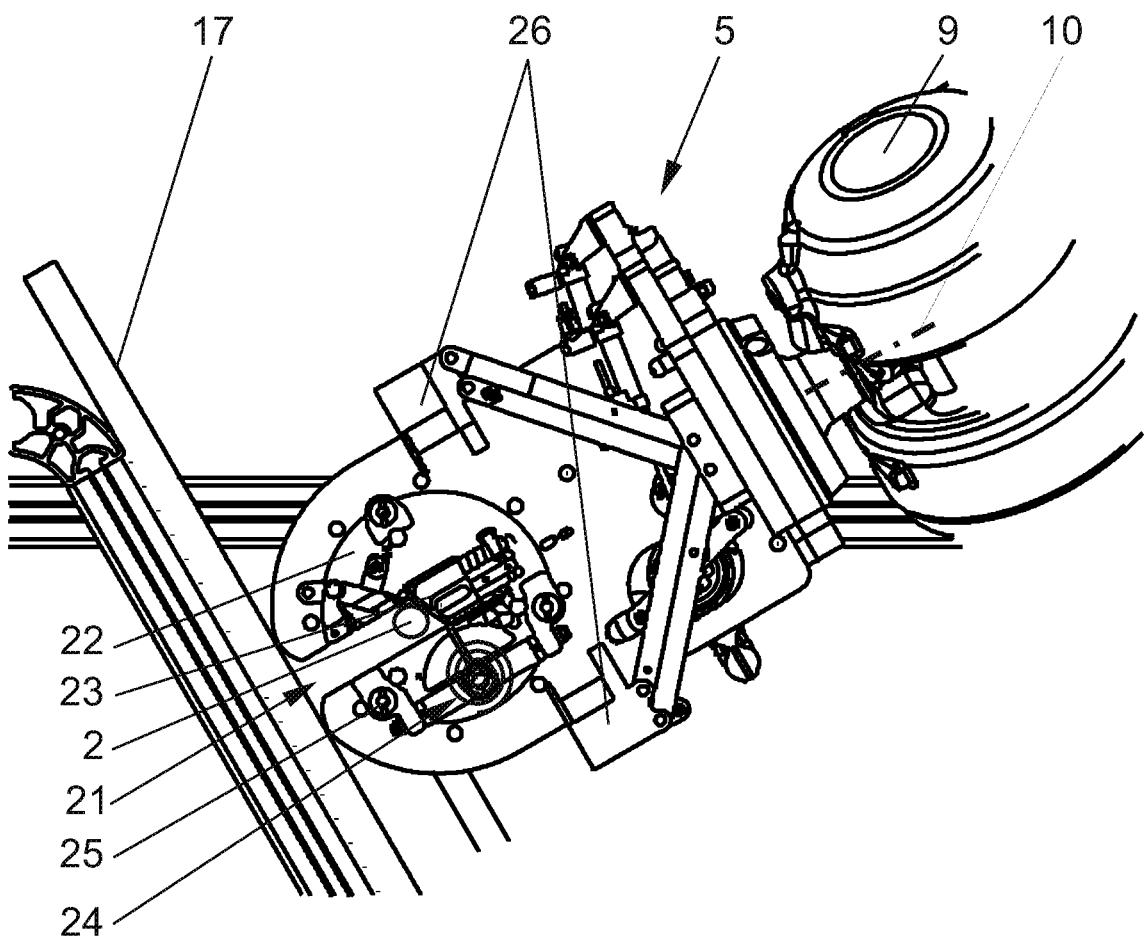

FIG. 2 shows the winding head 5 from FIG. 1 in an enlarged diagram prior to the wrapping of the bundled item 2. The winding head 5 is illustrated from the rear view relative to the diagram from FIG. 1. The winding head 5 has an opening 21 for introducing the bundled item 2 and a rotatable body 22 that can be driven rotatably. The rotatable body 22 carries a movable mating jaw 23 for bracing the bundled item 2 and a roll 24 containing the length of adhesive tape predetermined for the intended portion 16 of the bundled item 2. The roll 24 is composed of the roll body 15 described in the foregoing and of the intended length of adhesive tape wound on it. Furthermore, a guide device 25 for guiding the adhesive tape and for pulling it off from the roll 24 is disposed on the rotatable body 22.

The winding head 5 is situated in a home position, in which guide elements 26 disposed on both sides of the rotatable body 22 for guiding and bracing the bundled item 2 radially are swiveled outward. For reversal of angle, a starting portion of the adhesive tape is first pulled off from the roll 24 and held in front of the opening 21. Then the winding head 5 with its opening 21 is moved over the portion 16 in question of the bundled item 2, so that the bundled item 2 arrives at the starting portion of the adhesive tape. In addition, the guide elements 26 swivel toward the bundled item 2 and embrace it. In a subsequent rotation of the rotatable body 22 and simultaneous guiding of the winding head 5 along the bundled item 2, the adhesive tape is wrapped around the intended portion 16 of the bundled item 2. Because the roll 24 has only the length of adhesive tape predetermined for the portion 16 of the bundled item 2 to be wrapped, the portion 16 is wrapped once the adhesive tape is consumed. The basic principle of such a winding head 5 is known from the prior art, so that it is being cited for the further disclosure.

Figure 3:
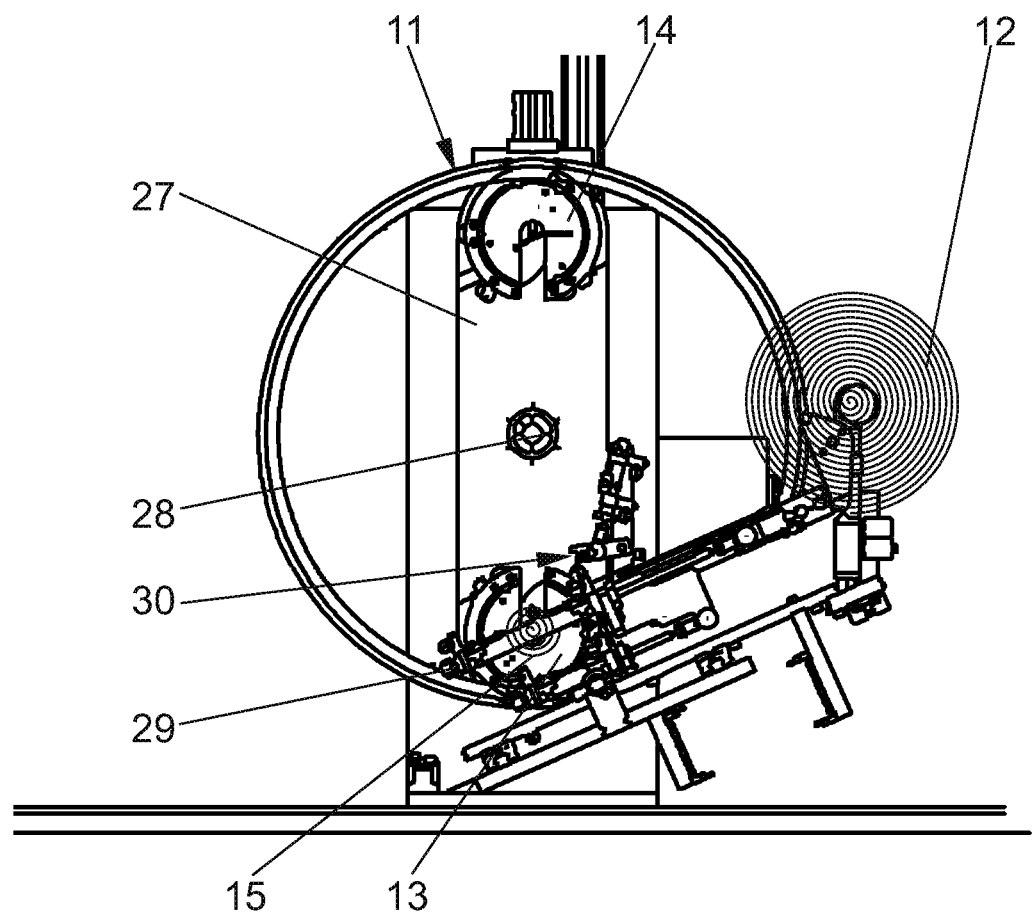

FIG. 3 shows the rewinding unit 11 of the winding device 1 from FIG. 1. This rewinding unit 11 holds the at least one stock roll 12 with a stock of adhesive tape and the two receptacles 13, 14 for roll body 15. In an alternative embodiment, not illustrated, several stock rolls 12 containing different adhesive tapes may be disposed one above the other. The receptacles 13, 14 are disposed at the ends of a two-sided swivel arm 27. The swivel arm 27 has a middle bearing 28, so that the positions of the receptacles 13, 14 may be switched. In an alternative embodiment, not illustrated, obviously several receptacles may be disposed, for example, on a turntable.

One of the receptacles is situated in a delivery position, in which one roll body 15 containing the predesignated quantity of adhesive tape wound onto it is received by the winding head 5 and in which an empty roll body 15 can be returned from the winding head 5 to the rewinding unit 11. This delivery takes place in that the winding head 5 is moved by the robot arm 4 with its corresponding position over the delivery position. The other of the receptacles 13 is situated in a winding position, in which the roll body 15 containing a predetermined quantity of adhesive tape can be rewound from the stock roll 12.

The rewinding unit 11 additionally has a tape pull-off device 29, by means of which the adhesive tape is pulled off from the stock roll 12 and fed to the roll body 15 situated in the winding position. Hereby the predetermined length of adhesive tape may be wound onto the roll body 15. Furthermore, the rewinding unit 11 has a cutting device 30 for severing the predetermined length of adhesive tape from the adhesive tape situated on the stock roll 12.

Figure 4:
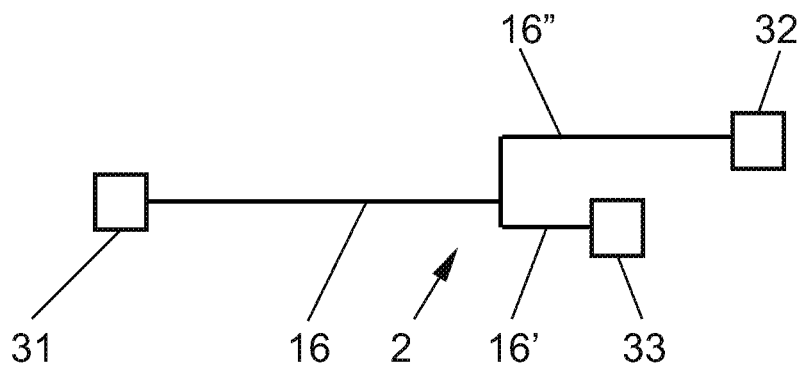

FIG. 4 shows the bundled item 2 from FIG. 1 in a particularly simple configuration with plug contacts 31-33 at its ends, as is standard in cable harnesses of motor vehicles. The bundled item 2 has three portions 16, 16', 16", which are to be wrapped with the adhesive tape as described in the foregoing. The portions 16, 16', 16" are respectively of different lengths and have various bends or angles. Each of the portions 16, 16', 16" needs a predetermined length of adhesive tape for its wrapping. This predetermined length of adhesive tape is calculated from the length of the respective portion 16, 16', 16", its diameter and the intended number of wrappings of the adhesive tape per length unit. In the illustrated exemplary embodiment of the bundled item 2, therefore, three roll bodies 15 with respectively a predetermined length of adhesive tape are to be prepared.

The invention claimed is:

1. A winding device for wrapping an elongated bundled item with an adhesive tape, having a winding head, having a rotatable body, mounted to rotate, of the winding head, having a roll for the stock of the adhesive tape and having a cutting device for cutting the adhesive tape to a predetermined length, wherein the cutting device is disposed outside the winding head and the predetermined length of the adhesive tape is held in the winding head.

2. The winding device according to claim 1, wherein the roll is disposed on the rotatable body and the adhesive tape on the roll is limited to the predetermined length.

3. The winding device according to claim 1, wherein a stock roll containing a multiple of the predetermined length is disposed outside the winding head.

4. The winding device according to claim 3, wherein a rewinding unit is provided with the stock roll containing a multiple of the predetermined length and with at least one roll body for receiving the predetermined length of the adhesive tape, and also has a tape pull-off device for transfer of the adhesive tape from the stock roll to the roll body.

5. The winding device according to claim 4, wherein the receptacles can be moved from a winding position, in which the rewinding unit is ready for transfer of the adhesive tape, to a delivery position, in which the receptacles containing the roll are ready for delivery to the winding head.

6. The winding device according to claim 4, wherein the cutting device is disposed on the rewinding unit.

7. The winding device according to claim 4, wherein the rewinding unit has several stock rolls containing different adhesive tapes.

8. The winding device according to claim 1, wherein the rewinding unit has several receptacles for holding roll bodies.

* * * * *